UNITED STATES PATENT OFFICE.

GIOVANNI MORSELLI, OF MILAN, ITALY.

COPPER-CONTAINING COMPOUND FOR TREATING PLANT DISEASES AND PROCESS OF MAKING IT.

1,362,172.     Specification of Letters Patent.     Patented Dec. 14, 1920.

No Drawing.     Application filed May 5, 1919. Serial No. 294,652.

*To all whom it may concern:*

Be it known that I, GIOVANNI MORSELLI, subject of the King of Italy, resident of Milan, in the Kingdom of Italy, No. 28 Via Legnane, have invented new and useful Improvements in Copper-Containing Compounds for Treating Plant Diseases and Processes of Making Them, of which the following is a specification.

The subject matter of the present invention is a process for the manufacture of a product essentially comprising the copper containing compound $CaCl_2.3(CuO).X(H_2O)$, where X can assume different values, which is in the form of extremely fine, impalpable powder, of light blue color containing 40 to 45% copper.

The said product is intended for use against plant diseases from cryptogams and parasites, and owing to the extreme fineness by which it is characterized, is particularly adapted for use as well in powder conditions as in the state of suspension in water.

By the addition of inert powders such as kaolin, talc, calcium sulfate or calcium carbonate it can be diluted and its copper content reduced to the amount best adapted for the different purposes.

Further, by mingling with sulfur it can be advantageously used as a copper sulfur compound.

The above product is prepared by stirring in cold condition, a 46° Bé. cupric chlorid solution into milk of lime containing 15% calcium hydrate.

The proportions of the reagents should be so selected as to leave a slight excess of lime in the solution.

The precipitate thus obtained in a most finely divided form is filtered, washed and dried so as to contain about 17% water.

The resulting product is readily disintegrated into impalpable powder.

Having now described my invention and how the same is to be carried out, what I claim as my invention, is:

1. A process for the manufacture of a product essentially comprising the copper compound $CaCl_2.3(CuO).X(H_2O)$ and intended for use against plant diseases from cryptogams and parasites, consisting in slowly adding a 46° Bé. cupric chlorid solution, in cold condition, to milk of lime containing 15% calcium hydrate, under constant stirring until only a slight lime excess remains in the solution, then filtering the precipitate, then washing and drying the same and finally disintegrating the product so as to produce a very finely divided powder.

2. A powder product essentially comprising the copper compound $CaCl_2.3(CuO).X(H_2O)$ and intended for use against plant diseases from cryptogams and parasites, and mixed with an inert powder and with sulfur to form a finely divided powder product.

GIOVANNI MORSELLI.